US012634186B2

(12) United States Patent
Laporte et al.

(10) Patent No.: US 12,634,186 B2
(45) Date of Patent: May 19, 2026

(54) SYSTEMS AND METHODS RELATED TO A NULL-SPACE FOR A MIMO TRANSMITTER SYSTEM

(71) Applicant: Telefonaktiebolaget LM Ericsson (publ), Stockholm (SE)

(72) Inventors: Pierre-Andre Laporte, Gatineau (CA); Aaron Callard, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 549 days.

(21) Appl. No.: 18/044,339

(22) PCT Filed: Sep. 8, 2020

(86) PCT No.: PCT/IB2020/058340
§ 371 (c)(1),
(2) Date: Mar. 7, 2023

(87) PCT Pub. No.: WO2022/053848
PCT Pub. Date: Mar. 17, 2022

(65) Prior Publication Data
US 2023/0379202 A1     Nov. 23, 2023

(51) Int. Cl.
*H04L 27/26*       (2006.01)
*H04B 7/0452*      (2017.01)

(52) U.S. Cl.
CPC ....... *H04L 27/2623* (2013.01); *H04B 7/0452* (2013.01)

(58) Field of Classification Search
CPC ...... H04B 7/0452; H04B 7/043; H04B 7/046; G06F 17/16; H04L 27/26035; H04L 27/2628; H04L 67/306; H04W 4/021
See application file for complete search history.

(56) References Cited

U.S. PATENT DOCUMENTS 9,031,123 B2 * 5/2015 de Victoria ........... H04L 1/0038
                                                          375/267
2013/0170533 A1 * 7/2013 Khojastepour ...... H04B 7/0456
                                                          375/267
(Continued)

FOREIGN PATENT DOCUMENTS

EP           3057248 A1      8/2016
WO      2020084336 A1      4/2020

OTHER PUBLICATIONS

Author Unknown, "Technical Specification Group Radio Access Network; Study on channel model for frequencies from 0.5 to 100 GHz (Release 15)," Technical Specification 38.901, Version 15.0.0, Jun. 2018, 3GPP Organizational Partners, 91 pages.
(Continued)

*Primary Examiner* — Iqbal Zaidi
(74) *Attorney, Agent, or Firm* — Sonoda & Kobayashi Intellectual Property Law; Sarvajit S. Patil

(57)                    ABSTRACT

Systems and methods are disclosed herein for a Convex Reduction of Amplitude (CRAM) based processing scheme for a Multiple Input Multiple Output (MIMO) Orthogonal Division Multiplexing (OFDM) transmitter system. In one embodiment, a method performed by a processing system for a MIMO OFDM transmitter system comprises precoding frequency-domain input signals to provide frequency-domain precoded signals for multiple subcarriers. The method further comprises processing the frequency-domain precoded signals in accordance with a CRAM-based processing scheme to provide time-domain precoded signals for respective transmit branches of the MIMO OFDM transmitter system. The CRAM-based processing scheme uses projection matrices for the subcarriers, respectively, to project clipping energy into a null space of the MIMO OFDM transmitter system. Further, the projection matrices are a
(Continued)

OBTAIN PROJECTION MATRICES ($C_n$) THAT ARE BASED ON STATIC OR SEMI-STATIC INFORMATION THAT RELATES TO KNOWN DIRECTIONS AT WHICH THE TRANSMIT POWER OF THE MIMO TRANSMITTER SYSTEM IS LESS THAN A THRESHOLD
800

PERFORM (E.G., ZF OR CODEBOOK-BASED) PRECODING OF INPUT SIGNALS TO PROVIDE PRECODED SIGNALS
802

PROCESS THE PRECODED SIGNALS IN ACCORDANCE WITH A CRAM PROCESSING SCHEME TO PROVIDE TIME-DOMAIN TRANSMIT SIGNALS FOR MULTIPLE ANTENNA BRANCHES, RESPECTIVELY, OF THE MIMO OFDM TRANSMITTER SYSTEM, WHERE THE CRAM PROCESSING SCHEME USES THE PROJECTION MATRICES ($C_n$)
804

TRANSMIT THE TIME-DOMAIN TRANSMIT SIGNALS
806 function of static or semi-static information that defines the null space of the MIMO OFDM transmitter system.

19 Claims, 10 Drawing Sheets

(56) References Cited

U.S. PATENT DOCUMENTS

2019/0109700 A1\*   4/2019  Liu ..................... H04L 27/2662
2020/0052945 A1     2/2020  Kant et al.

OTHER PUBLICATIONS

Khawar, et al., "QPSK waveform for MIMO radar with spectrum sharing constraints," Physical Communication, vol. 17, Sep. 25, 2015, pp. 37-57.
Studer, Christopher, et al., "Democratic Representations," CORR abs/1401.3420, arXiv, Apr. 22, 2015, 43 pages.
International Search Report and Written Opinion for International Patent Application No. PCT/IB2020/058340, mailed May 27, 2021, 15 pages.

\* cited by examiner

Antenna element

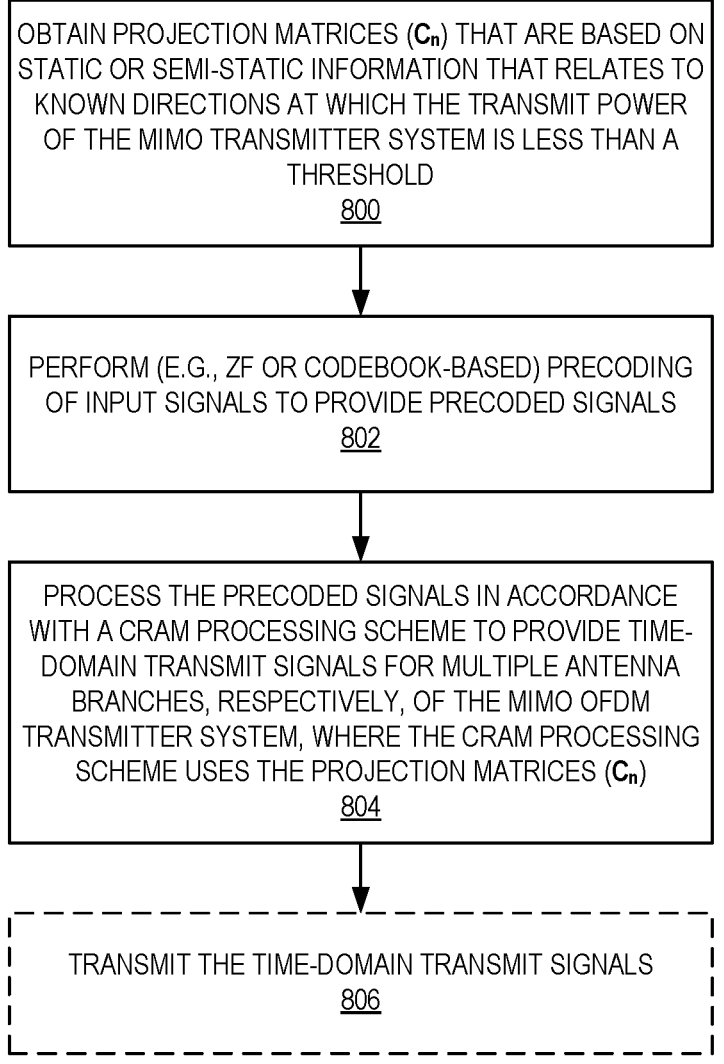

OBTAIN PROJECTION MATRICES ($C_n$) THAT ARE BASED ON STATIC OR SEMI-STATIC INFORMATION THAT RELATES TO KNOWN DIRECTIONS AT WHICH THE TRANSMIT POWER OF THE MIMO TRANSMITTER SYSTEM IS LESS THAN A THRESHOLD
800

PERFORM (E.G., ZF OR CODEBOOK-BASED) PRECODING OF INPUT SIGNALS TO PROVIDE PRECODED SIGNALS
802

PROCESS THE PRECODED SIGNALS IN ACCORDANCE WITH A CRAM PROCESSING SCHEME TO PROVIDE TIME-DOMAIN TRANSMIT SIGNALS FOR MULTIPLE ANTENNA BRANCHES, RESPECTIVELY, OF THE MIMO OFDM TRANSMITTER SYSTEM, WHERE THE CRAM PROCESSING SCHEME USES THE PROJECTION MATRICES ($C_n$)
804

TRANSMIT THE TIME-DOMAIN TRANSMIT SIGNALS
806

FIG. 8

SYSTEMS AND METHODS RELATED TO A NULL-SPACE FOR A MIMO TRANSMITTER SYSTEM

This application is a 35 U.S.C. § 371 national phase filing of International Application No. PCT/IB2020/058340, filed Sep. 8, 2020, the disclosure of which is incorporated herein by reference in its entirety.

TECHNICAL FIELD

The present disclosure relates to a Multiple Input Multiple Output (MIMO) transmitter system and, more specifically, to a null space for a MIMO transmitter system that is used for, e.g., Crest Factor Reduction (CFR).

BACKGROUND

In Christoph Studer et al., "Democratic Representations," CORR abs/1401.3420, Apr. 22, 2015, 43 pages (hereinafter the "Studer paper"), a very elegant algorithm called Convex Reduction of Amplitude (CRAM) is proposed for reducing the Peak-to-Average Power Ratio (PAPR) of massive Multiple Input Multiple Output (MIMO) systems to unforeseen levels by taking advantage of the large number of degrees of freedom that are afforded by large antenna arrays. This is achieved by "hiding" the clipping energy which corresponds to the additive signal perturbation that is introduced to reduce the signal PAPR, in the channel null space, i.e. in directions where no scheduled User Equipment (UE) is impacted.

To do so, some projection matrices $C_n \in \mathbb{C}^{M \times M}$, where n is the subcarrier index and M is the number of antennas, are needed in the CRAM framework of the Studer paper to ensure that the clipping noise is transparent to the scheduled UEs. The projection matrices are defined as:

$$C_n = I - P_n^{ZF} H_n \qquad (1)$$

where:
I is the M×M identity matrix.
$H_n \in \mathbb{C}^{K \times M}$ is the channel matrix for subcarrier n, where K is the number of MIMO layers.

$$P_n^{ZF} \in \mathbb{C}^{M \times K}$$

is the zero-forcing precoding matrix for subcarrier n and is expressed as:

$$P_n^{ZF} = H_n^\dagger \equiv H_n^H \left( H_n H_n^H \right)^{-1} \qquad (2)$$

In turn, the channel matrix $H_n$ may be expressed in terms of its Singular Value Decomposition (SVD) components:

$$H_n = U_n \cdot \sum_n \cdot V_n^H \qquad (3)$$

where:
$U_n \in \mathbb{C}^{K \times K}$ contains the left singular vectors.

$\Sigma_n \in \mathbb{R}^{K \times M}$ is a diagonal matrix containing the singular values.
$V_n \in \mathbb{C}^{M \times M}$ contains the right singular vectors.
Substituting (3) and (2) into (1) yields:

$$
\begin{aligned}
C_n &= I - V_n \cdot \sum_n^H \cdot U_n^H \cdot \left( U_n \cdot \sum_n \cdot V_n^H \cdot V_n \cdot \sum_n^H \cdot U_n^H \right)^{-1} \cdot U_n \cdot \sum_n \cdot V_n^H \quad (4) \\
&= I - V_n \cdot \sum_n^H \cdot U_n^H \cdot \left( U_n \cdot \sum_n \cdot I \cdot \sum_n^H \cdot U_n^H \right)^{-1} \cdot U_n \cdot \sum_n \cdot V_n^H \\
&= I - V_n \cdot \sum_n^H \cdot U_n^H \cdot \left( U_n \cdot \lambda_n \cdot U_n^H \right)^{-1} \cdot U_n \cdot \sum_n \cdot V_n^H \\
&= I - V_n \cdot \sum_n^H \cdot U_n^H \cdot \left( U_n \cdot \lambda_n^+ \cdot U_n^H \right) \cdot U_n \cdot \sum_n \cdot V_n^H \\
&= I - V_n \cdot \sum_n^H \cdot I \cdot \lambda_n^+ \cdot I \cdot \sum_n \cdot V_n^H \\
&= I - V_n \cdot \tilde{I} \cdot V_n^H \\
&= I - S_n \cdot S_n^H
\end{aligned}
$$

where:
$\lambda_n \in \mathbb{R}^{K \times K}$ is the diagonal matrix of the eigenvalues which corresponds to $$\lambda_n^+ \in \mathbb{R}^{K \times K}$$

$$\lambda_n = \sum_n \cdot \sum_n^H .$$

$$
\lambda_n^+ = \begin{bmatrix}
1/\lambda_{0,n} & 0 & \dots & 0 \\
0 & 1/\lambda_{1,n} & & \dots \\
\dots & & \dots & 0 \\
0 & \dots & 0 & 1/\lambda_{K-1,n}
\end{bmatrix} \qquad (5)
$$

where:
$\tilde{I}$ is an incomplete M×M identity matrix with only the first K diagonal entries set to one and the remaining entries set to zero.
$S_n \in \mathbb{C}^{M \times K}$ is the column span of the UE signal in the $V_n$ matrix and it corresponds to the UE eigenvectors, also known as the UE signal subspace.

Equation (4) demonstrates how the $C_n$ projection matrices for CRAM can be directly expressed in terms of the scheduled UE eigenvectors.

In codebook-based systems, the projection matrices for CRAM are defined as:

$$C_n^{CB} = I - CB_n \cdot CB_n^H \qquad (6)$$

where $CB_n$ is the matrix of the used codebooks for subcarrier n.

International Patent Application Publication No. WO 2020/084336 A1, entitled "SYSTEMS AND METHODS FOR MULTI-CARRIER OR MULTI-BAND LOW-PAPR PRECODING THAT HANDLE CYCLIC PREFIX," discloses systems and methods in which a CRAM-based PAPR reduction scheme is utilized in a reciprocity-based Zero-Forcing (ZF) MIMO transmitter.

SUMMARY

Systems and methods are disclosed herein for a Convex Reduction of Amplitude (CRAM) based processing scheme for a Multiple Input Multiple Output (MIMO) Orthogonal Division Multiplexing (OFDM) transmitter system that uses a null space of the MIMO OFDM transmitter system that is based on static or semi-static information. In one embodiment, a method performed by a processing system for a MIMO OFDM transmitter system comprises precoding a plurality of frequency-domain input signals to provide frequency-domain precoded signals for a plurality of subcarriers. The plurality of frequency-domain input signals comprise information for one or more transmit layers. The method further comprises processing the frequency-domain precoded signals in accordance with a CRAM-based processing scheme to provide a plurality of time-domain precoded signals for a plurality of respective transmit branches of the MIMO OFDM transmitter system. The CRAM-based processing scheme uses a plurality of projection matrices for the plurality of subcarriers, respectively, to project clipping energy into a null space of the MIMO OFDM transmitter system. Further, the plurality of projection matrices are a function of static or semi-static information that defines the null space of the MIMO OFDM transmitter system, where the static or semi-static information relates to physical directions at which transmit power of the MIMO OFDM transmitter system towards one or more receivers (e.g., one or more User Equipments (UEs)) is less than a threshold transmit power level. In this manner, the CRAM-based processing scheme does not suffer from degraded performance due to use of a null space that is based on imperfect channel knowledge.

In one embodiment, the method further comprises providing the plurality of time-domain precoded signals to the plurality of transmit branches of the MIMO OFDM transmitter system.

In one embodiment, the static or semi-static information comprises one or more physical characteristics of an antenna array of the MIMO OFDM transmitter system. In one embodiment, the null space of the MIMO OFDM transmitter system comprises an array null space of the antenna array of the MIMO OFDM transmitter system, where the array null space is a function of the one or more physical characteristics of the antenna array. In one embodiment, the static or semi-static information further comprises: (i) a physical deployment of one or more cells of a Radio Access Network (RAN) served by a base station in which the MIMO OFDM transmitter system is implemented, (ii) a physical deployment of wireless communication devices within a coverage area of one or more cells of a RAN served by a base station in which the MIMO OFDM transmitter system is implemented, (iii) historical channel information for one or more wireless communication devices, or (iv) a combination of any two or more of (i)-(iii).

In one embodiment, the plurality of projection matrices are defined as $C_n \in \mathbb{C}^{M \times M}$ where:

$$C_n = S_{arrayNull,n} \cdot S^H_{arrayNull,n}$$

where $S_{arrayNull,n}$ is the null space of the MIMO OFDM transmitter system.

In one embodiment, the static or semi-static information comprises a physical deployment of one or more cells of a RAN served by a base station in which the MIMO OFDM transmitter system is implemented.

In one embodiment, the static or semi-static information comprises a physical deployment of wireless communication devices within a coverage area of one or more cells of a RAN served by a base station in which the MIMO OFDM transmitter system is implemented.

In one embodiment, the static or semi-static information comprises historical channel information for one or more wireless communication devices.

In one embodiment, the method further comprises obtaining the plurality of projection matrices. In one embodiment, obtaining the plurality of projection matrices comprises obtaining the plurality of projection matrices or information from which the plurality of projection matrices are computed or otherwise determined from an entity that is external to the MIMO OFDM transmitter system.

Corresponding embodiments of a processing system for a MIMO OFDM transmitter system are also disclosed. In one embodiment, a processing system for a MIMO OFDM transmitter system comprises precoder circuitry configured to precode a plurality of frequency-domain input signals to provide frequency-domain precoded signals for a plurality of subcarriers, where the plurality of frequency-domain input signals comprise information for one or more transmit layers. The processing system further comprises processing circuitry configured to process the frequency-domain precoded signals in accordance with a CRAM-based processing scheme to provide a plurality of time-domain precoded signals for a plurality of respective transmit branches of the MIMO OFDM transmitter system. The CRAM-based processing scheme uses a plurality of projection matrices for the plurality of subcarriers, respectively, to project clipping energy into a null space of the MIMO OFDM transmitter system. Further, the plurality of projection matrices are a function of static or semi-static information that defines the null space of the MIMO OFDM transmitter system, where the static or semi-static information relates to physical directions at which transmit power of the MIMO OFDM transmitter system is less than a threshold transmit power level.

In one embodiment, the processing circuitry is further configured to provide the plurality of time-domain precoded signals to the plurality of transmit branches of the MIMO OFDM transmitter system.

In one embodiment, the static or semi-static information comprises one or more physical characteristics of an antenna array of the MIMO OFDM transmitter system. In one embodiment, the null space of the MIMO OFDM transmitter system comprises an array null space of the antenna array of the MIMO OFDM transmitter system, wherein the array null space is a function of the one or more physical characteristics of the antenna array. In one embodiment, the static or semi-static information further comprises: (i) a physical deployment of one or more cells of a RAN served by a base station in which the MIMO OFDM transmitter system is implemented, (ii) a physical deployment of wireless communication devices within a coverage area of one or more cells of a RAN served by a base station in which the MIMO OFDM transmitter system is implemented, (iii) historical channel information for one or more wireless communication devices, or (iv) a combination of any two or more of (i)-(iii).

In one embodiment, the plurality of projection matrices are defined as $C_n \in \mathbb{C}^{M \times M}$ where:

$$C_n = S_{arrayNull,n} \cdot S_{arrayNull,n}^H$$

where $S_{arrayNull,n}$ is the null space of the MIMO OFDM transmitter system.

In one embodiment, the static or semi-static information comprises a physical deployment of one or more cells of a RAN served by a base station in which the MIMO OFDM transmitter system is implemented.

In one embodiment, the static or semi-static information comprises a physical deployment of wireless communication devices within a coverage area of one or more cells of a RAN served by a base station in which the MIMO OFDM transmitter system is implemented.

In one embodiment, the static or semi-static information comprises historical channel information for one or more wireless communication devices.

In one embodiment, the processing circuitry is further configured to obtain the plurality of projection matrices. In one embodiment, the processing circuitry is further configured to obtain the plurality of projection matrices by obtaining the plurality of projection matrices or information from which the plurality of projection matrices are computed or otherwise determined from an entity that is external to the MIMO OFDM transmitter system.

In one embodiment, a method performed by a processing system for a MIMO OFDM transmitter system comprises obtaining a plurality of projection matrices for the plurality of subcarriers, respectively, that are a function of static or semi-static information that defines a null space of the MIMO OFDM transmitter system. The static or semi-static information relates to physical directions at which transmit power of the MIMO OFDM transmitter system is less than a threshold transmit power level. The method further comprises using the plurality of projection matrices to generate a plurality of transmit signals for a plurality of respective transmit branches of the MIMO OFDM transmitter system.

In one embodiment, obtaining the plurality of projection matrices comprises obtaining the plurality of projection matrices or information from which the plurality of projection matrices are computed or otherwise determined from an entity that is external to the MIMO OFDM transmitter system.

In one embodiment, the static or semi-static information comprises: (a) one or more physical characteristics of an antenna array of the MIMO OFDM transmitter system, (b) a physical deployment of one or more cells of a RAN served by a base station in which the MIMO OFDM transmitter system is implemented, (c) a physical deployment of wireless communication devices within a coverage area of one or more cells of a RAN served by a base station in which the MIMO OFDM transmitter system is implemented, (d) historical channel information for one or more wireless communication devices, or (e) a combination of any two or more of (a)-(d).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 is a flow chart that illustrates the operation of the baseband processing system of the MIMO transmitter system in accordance with an embodiment of the present disclosure;

DETAILED DESCRIPTION

Figure 1:
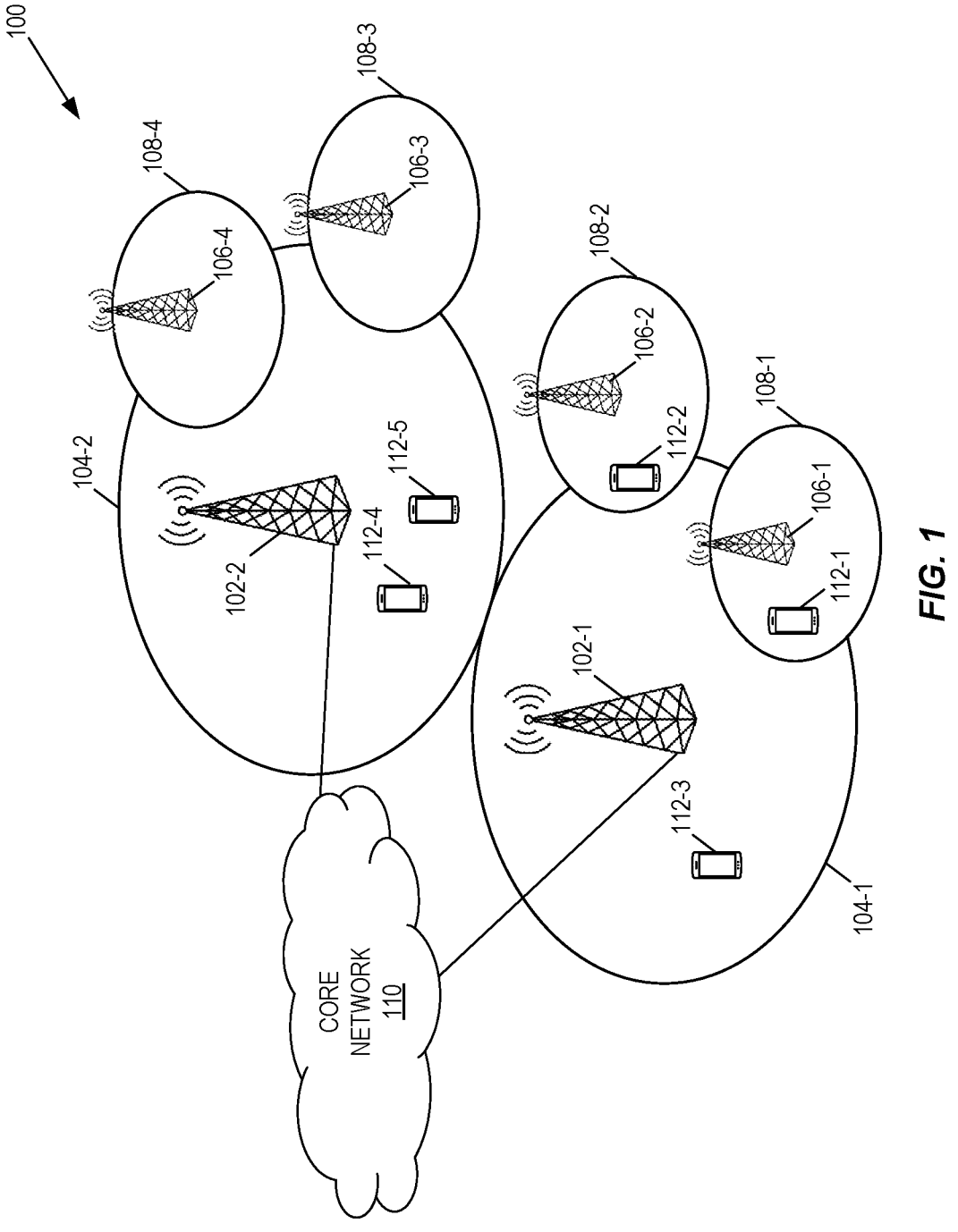
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The Convex Reduction of Amplitude (CRAM) algorithm proposed in Christoph Studer et al., "Democratic Representations," CORR abs/1401.3420, Apr. 22, 2015, 43 pages (hereinafter the "Studer paper") is well suited for environments in which very good channel information is available. Such environments include Time Division Duplex (TDD) systems due to channel reciprocity. In TDD-based wireless communication systems such as Long Term Evolution (LTE) or Fifth Generation (5G) New Radio (NR) systems using TDD, downlink Channel State Information (CSI) can be acquired by measuring the uplink channel response using pilot symbols, also known as Sounding Reference Symbols (SRSs), that are transmitted by User Equipments (UEs).

The base station channel response estimate is best when the SRS channel sounding periodicity is short. Under those circumstances, the estimated channel null space aligns relatively well with the actual channel null space so that the clipping energy is almost transparent to the scheduled UEs (i.e., there is low Error Vector Magnitude (EVM) and throughput impact). However, as the SRS channel sounding periodicity increases, the channel estimate becomes out-of-date with the actual channel response. This phenomenon, which is called "channel aging", is more pronounced with fast moving UEs. Additionally, channel measurements become increasingly noisy as UEs are farther away from the base station. As the channel estimation error increases, the clipping energy that is projected onto the estimated channel null space becomes more visible to the scheduled UEs, and the Peak-to-Average Power Ratio (PAPR) reduction method from the Studer paper starts to negatively impact the downlink performance (i.e., higher EVM and throughput impact).

The downlink performance impact of the CRAM scheme from the Studer paper is more acute in codebook-based systems where an indication of the best directions are reported by the UEs (i.e., where Precoding Matrix Indices (PMIs) are fed back from the UEs to indicate the best precoding matrices for the UEs from among a set of precoding matrices defined in a codebook). This is due to the following. In codebook-based systems, the channel is quantized using a coarser granularity than in reciprocity-based systems due to a limited set of precoding codebook entries. Further, in codebook-based systems, there are some delays introduced by the downlink channel estimation process as well as the reporting periodicities from the UE to the base station, so that the PMIs received at the base station are always lagging behind the actual channel response.

There are many different ways that channel information can be determined by the base station. The important aspect is that this channel knowledge is not perfect, and this poor channel knowledge impacts the performance of the currently existing CRAM schemes for Crest Factor Reduction (CFR).

Another issue with the existing CRAM schemes is that the channel knowledge is frequency dependent. This causes additional complexity increase due to the need for frequency-domain processing. If channel knowledge can be limited to wideband estimates (i.e., time-domain), then the need for frequency-domain processing can be avoided.

Systems and methods are disclosed herein for addressing the aforementioned or other problems. More specifically, in some embodiments, systems and methods disclosed herein provide a CFR scheme (e.g., a CRAM-based CFR scheme) that uses projection matrices that are based on a null space of a Multiple Input Multiple Output (MIMO) (e.g., massive-MIMO) transmitter system, where the null space of the MIMO transmitter system is defined by static or semi-static information such as, for example, one or more physical characteristics of an antenna array of the MIMO transmitter system. The null space corresponds to multiple physical directions in which the MIMO transmitter system transmits the lowest, or at least sufficiently low (e.g., less than a predefined or predetermined threshold), energy towards the scheduled UEs. In one embodiment, the null space of the MIMO transmitter system includes an array null space of the antenna array of the MIMO transmitter system. Note that, as used herein, an "antenna array null space" or "array null space" is a null space that corresponds to physical directions where the antenna array has low transmitted power towards the scheduled UEs (i.e., transmitted power that is less than a predefined or predetermined threshold transmit power level) due to the antenna elements or antenna subarrays having low gain (i.e., gain that is less than a predefined or predetermined threshold) in these directions. In another embodiment, the null space of the MIMO transmitter system includes, in addition to or as an alternative to the array null space, a null space due to one or more static or semi-static factors other than the physical characteristics of the antenna array such as, for example, a physical deployment of one or more cells of a Radio Access Network (RAN) and/or a physical deployment of wireless communication devices within a coverage area of one or more cells of a RAN and/or historical channel information. By using these projection matrices, the CFR scheme hides, or projects, the clipping energy of the MIMO transmitter system into the null space to enable low PAPR waveforms. By using the projection matrices that are a function of static or semi-static information such as, e.g., the array null space, this can be done while also limiting the downlink throughput impact on the scheduled UEs as well as the downlink intercell interference.

In some embodiments, systems and methods disclosed herein provide CRAM-based CFR using projection matrices that are based on an antenna array null space of a respective MIMO transmitter. However, in some other embodiments, the projection matrices used for the CFR scheme (e.g., the CRAM-based CFR scheme) are based on additional or alternative parameters such as, e.g., physical sector deployment of one or more cells in which the MIMO transmitter is used for transmission, historical UE channel information, and/or physical deployment of UEs.

The solutions proposed herein are agnostic of the precoding scheme used in the MIMO transmitter. This enables PAPR reduction while offering low receive EVM at the UEs in both codebook-based systems as well as in reciprocity-based systems with large channel sounding periodicities. In addition, the proposed array null space is time invariant and only needs to be defined once for each antenna array, thus enabling some power savings due to the low processing cost.

FIG. 1 illustrates one example of a cellular communications system 100 in which embodiments of the present disclosure may be implemented. In the embodiments described herein, the cellular communications system 100 is a 5G System (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC); however, the solutions disclosed herein are not limited thereto. In this example, the RAN includes base stations 102-1 and 102-2, which in the 5GS include NR base stations (gNBs) and optionally next generation enhanced or evolved Node Bs (eNBs) (ng-eNBs) (i.e., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

Embodiments of a CFR scheme that uses projection matrices that are based on static or semi-static information are disclosed herein. In the preferred embodiments described herein, the CFR scheme is a CRAM-based CFR scheme. Further, in the preferred embodiments described herein, the projection matrices are based on an array null space of an antenna array of a MIMO transmitter system, where the MIMO transmitter system may be implemented in a radio node such as, e.g., a radio access node such as the base station 102 or low power node 106 or a wireless communication device 112. However, additional or alternative parameters may be used to determine the projection matrices, as described below.

Figure 2:
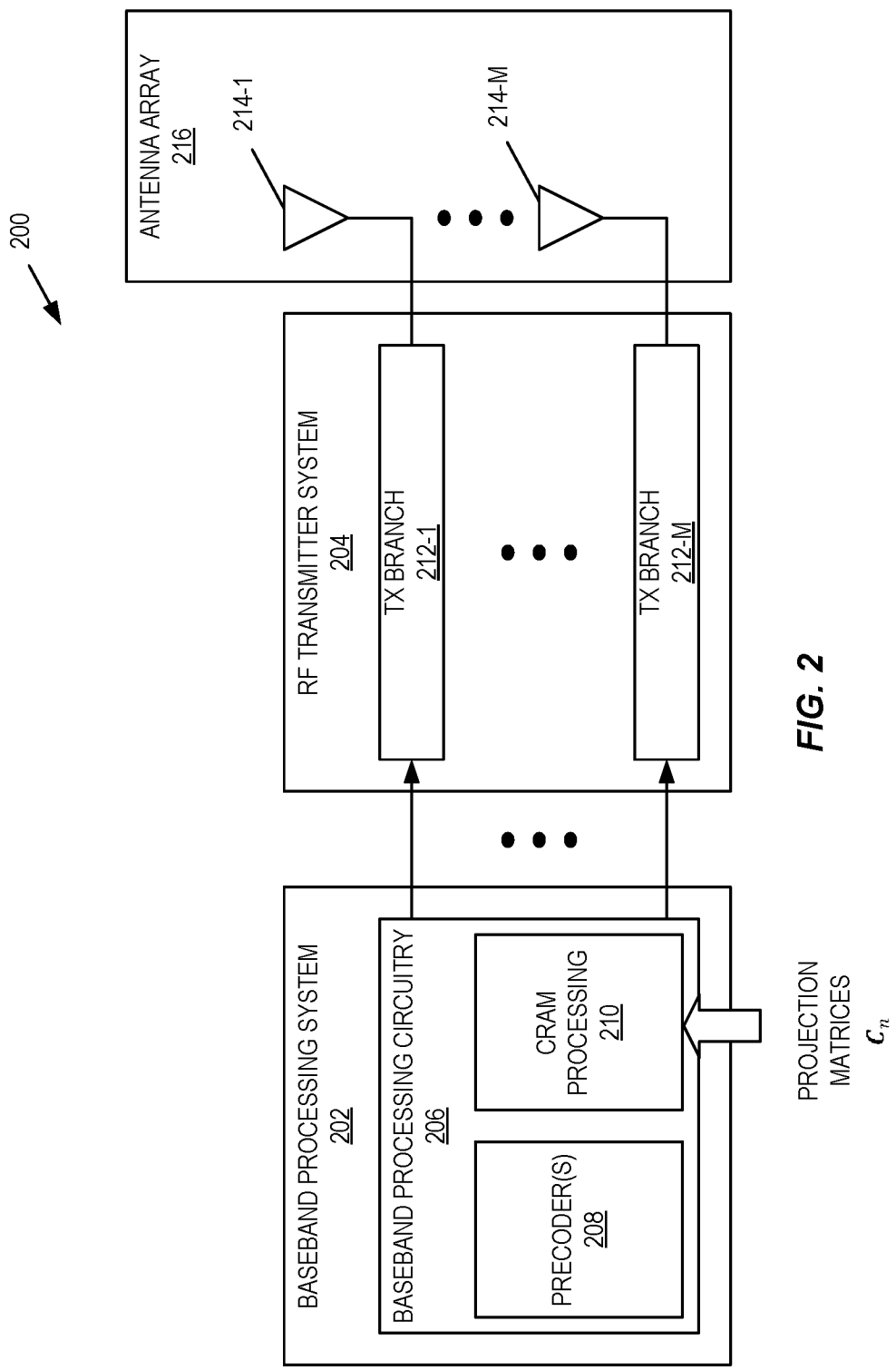
FIG. 2 is a schematic block diagram of a Multiple Input Multiple Output (MIMO) transmitter system that implements a Convex Reduction of Amplitude (CRAM) based Crest Factor Reduction (CFR) scheme that uses projection matrices that are based on an array null space and/or other factor(s) in accordance with an embodiment of the present disclosure.

FIG. 2 is a schematic block diagram of a MIMO transmitter system 200 that implements a CRAM-based CFR scheme that uses projection matrices that are based on static or semi-static information in accordance with an embodiment of the present disclosure. The MIMO transmitter system 200 uses an Orthogonal Frequency Division Multiplexing (OFDM) based transmission scheme and, as such, is also referred to herein as a MIMO OFDM transmitter system 200. The MIMO transmitter system 200 may be part of a radio node such as, e.g., a radio access node such as the base station 102 or low power node 106 or a wireless communication device 112. The MIMO transmitter system 200 includes a baseband processing system 202 and Radio Frequency (RF) transmitter circuitry 204. The baseband processing system 202 includes hardware or a combination of hardware and software. In particular, the baseband processing system 202 includes baseband processing circuitry 206 (e.g., one or more Digital Signal Processors (DSPs), one or more Application Specific Integrated Circuits (ASICs), one or more Field Programmable Gate Arrays (FPGAs), and/or the like). In some embodiments, the baseband processing circuitry 206 includes memory storing software that is executed by one or more of processors within the baseband processing circuitry 206. This hardware and, in some embodiments, software implements one or more precoders 208 (e.g., one or more Zero-Forcing (ZF) precoders or one or more codebook-based precoders) and a CRAM processing system 210, as will be described in detail below. The precoder(s) 208 and the CRAM processing system 210 perform the precoding and CRAM processing according to embodiments of the present disclosure. The RF transmitter system 204 includes multiple transmitter branches 212-1 through 212-M coupled to antenna elements or antenna element subarrays 214-1 through 214-M, respectively, of an antenna array 216 of the MIMO transmitter system 200. As will be appreciated by one of skill in the art, each of the transmitter branches 212-1 through 212-M includes circuitry such as, for example, an Analog-to-Digital Converter (ADC), upconversion circuitry (e.g., mixers), a filter, a power amplifier, and the like. Each transmitter branch 212 and its respective antenna element or antenna element subarray 214 is referred to herein as an antenna branch of the MIMO transmitter system 200.

As illustrated, the CRAM processing circuitry 210 performs a CRAM-based CFR scheme that uses projection matrices $C_n \in \mathbb{C}^{M \times M}$, where n is the subcarrier index and M is the number of antennas, to "hide", or project, the clipping noise into an antenna null space of the antenna array 216 of the MIMO transmitter system 200. Thus, in contrast to the projection matrices used in conventional CRAM-based CFR schemes which are based on channel information which is dynamic information that varies over time and potentially frequency, the projection matrices $C_n \in \mathbb{C}^{M \times M}$ used by the disclosed CRAM-based CFR scheme are based on static or semi-static information such as, e.g., the array null space (which itself is a function of the physical characteristics of the antenna elements or subarrays 214). In this manner, the problems associated with the conventional CRAM-based CFR schemes described above are overcome.

In regard to determining the projection matrices $C_n \in \mathbb{C}^{M \times M}$ based on the static or semi-static information, by various means, the MIMO transmitter system 200 may reasonably assume that there is not a significant transmit signal in certain physical directions relative to the antenna array 216. These assumptions can be based on several reasons including but not limited to those below. In all cases, a set of directions relative to the antenna array 216 are determined that are considered to be low risk of interfering with a particular UE.

1) Physical deployment of cells: For example, in a typical three sector deployment, if a UE is more than 60 degrees from the boresight of the antenna array 216, that UE would be handed over to the neighbor cell.
2) Historical information of channels for one or more UEs: By combining different channel measurements in the past for the UE(s), a set of directions which the UE(s) has not used before can be determined. This combination can be done in both time and frequency. There are many ways this combination could be done including finding the projection matrix which works for all past channels.
3) Physical deployment of UEs: In many deployments, the locations of UEs can be safely assumed to follow known patterns. For example, very few UEs are located on boats on lakes, or flying 300 meters above residential streets. This knowledge can be exploited either through rules of thumb (i.e., low likelihood of flying devices), or through active site measurements (e.g., this site has not measured any signals coming from the sky in the past), or through some third party database (e.g., Google Maps says no high rises in this area).
4) Physical characteristics of the antenna array 216: The underlying design of the antenna array 216 naturally focuses power in certain directions. It can be reasonable to assume that signals which are already reduced naturally due to the physical characteristics of the antenna array 216 will not normally be where significant UE channels exist.

From the known directions for which it can be reasonably assumed that there is not a significant transmit signal, the projection matrices $C_n$ for the CRAM-based CFR scheme disclosed herein can be determined, as described below.

The following describes a methodology for generating the projection matrices $C_n$ starting from item #4 in the above list (i.e., based on the physical characteristics of the antenna array 216). This methodology can be extended to use additional or alternative static or semi-static information, as also described herein.

Figure 3:
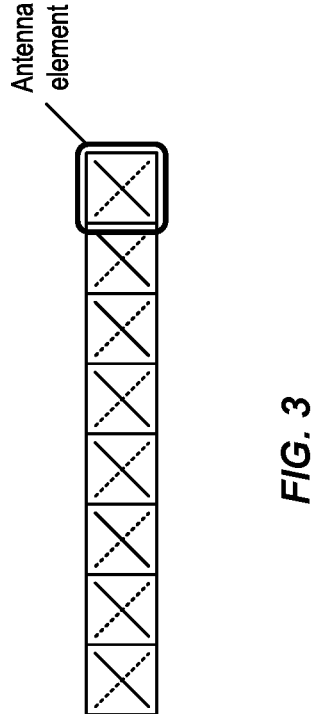
FIG. 3 one example of the antenna array in which the antenna array of the MIMO transmitter system includes eight antenna elements forming a Uniform Linear Array (ULA)

FIG. 3 illustrates one example of the antenna array 216 in which the antenna array 216 includes eight antenna elements forming a Uniform Linear Array (ULA). The total array radiation pattern can be approximated by multiplying the array pattern by the element pattern as follows:

$$totalRadiationPattern = arrayRadiationPattern \times elementRadiationPattern \qquad (7)$$

Figure 4:
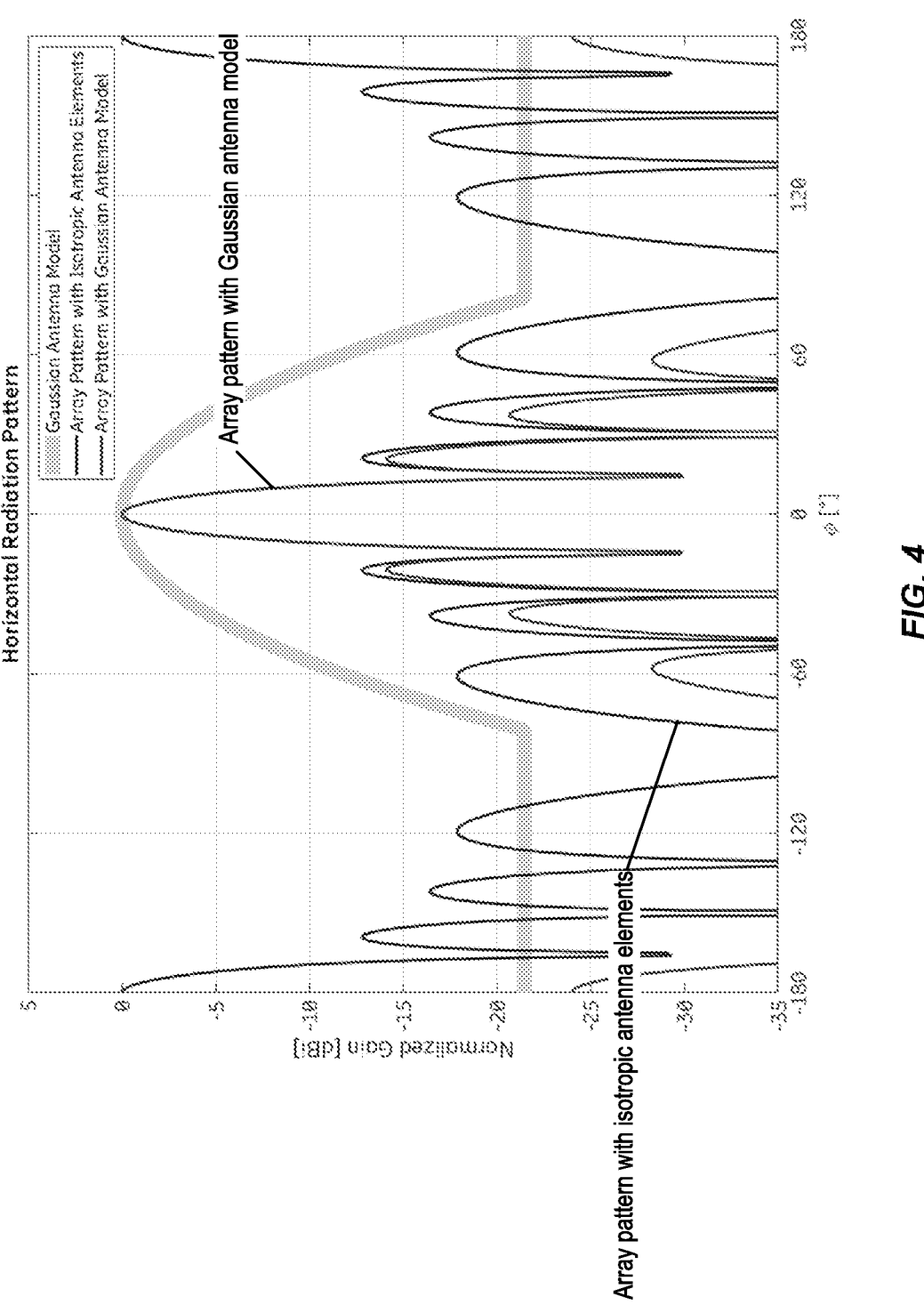
FIG. 4 shows the normalized ULA horizontal array pattern using an inter-element spacing of $\lambda/2$ and using "all one's" excitation weights.

FIG. 4 shows the normalized ULA horizontal array pattern using an inter-element spacing of $\lambda/2$ and using "all one's" excitation weights. In FIG. 4, it can be seen that the total array radiation pattern is greatly attenuated outside of the [−80° 80°]azimuth angle range due to the antenna element's inability to radiate in those directions.

For every specific array configuration and antenna element design, one must determine the optimal range of steering directions where the attenuation is largest.

Figure 5:
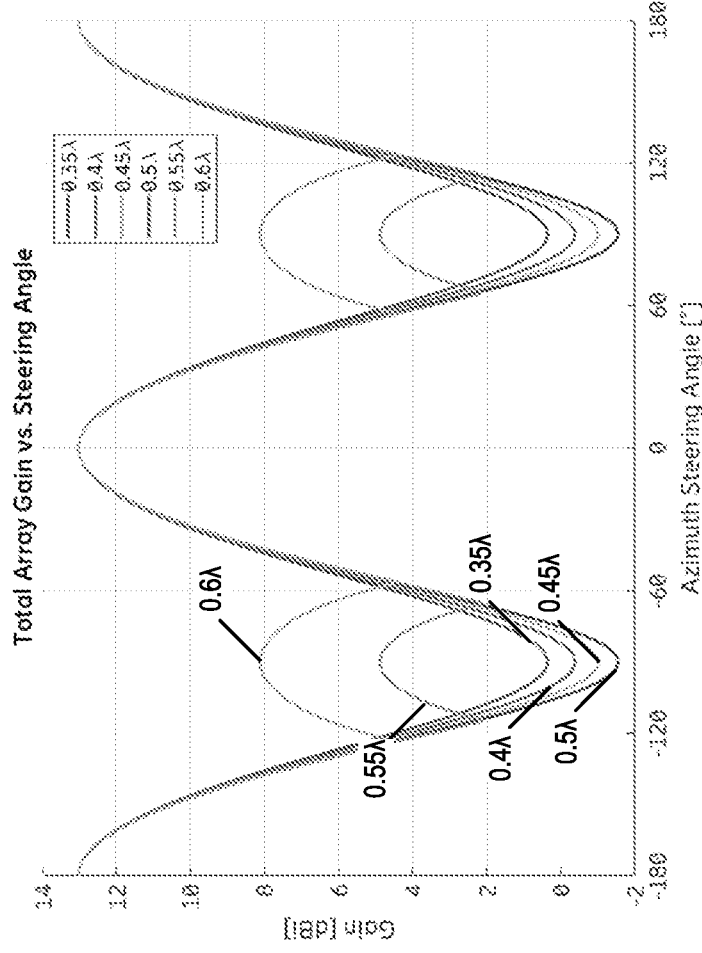
FIG. 5 shows an eight-element ULA total array gain versus the azimuth steering range using the Gaussian antenna response of FIG. 4 for various array inter-element distances.

FIG. 5 shows the eight element ULA total array gain versus the azimuth steering range using the Gaussian antenna response of FIG. 4 for various array inter-element distances. For this specific configuration, the largest attenuation levels are obtained at the azimuth steering angles of ±90° for a λ/2 inter-element distance. Some small performance degradation is observed as the inter-element distance is reduced below λ/2 due to the array being steered outside of its scanning range (i.e., the beam broadens). More severe performance impacts appear as the inter-element distance is increased beyond λ/2 as grating lobes can start appearing within the angular range where the antenna element radiates.

Figure 6:
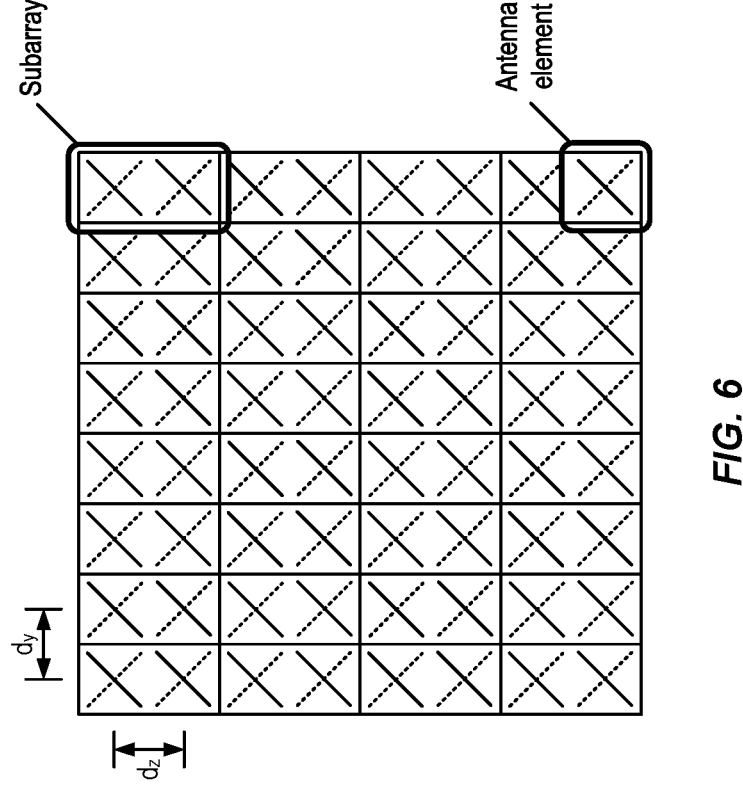
FIG. 6 introduces a Uniform Rectangular Array (URA) that is built by combining subarrays, which in turn correspond to some ULAs with a single input port.

FIG. 6 introduces a Uniform Rectangular Array (URA) that is built by combining subarrays, which in turn correspond to some ULAs with a single input port. In the figure, the horizontal and the vertical inter-element distances are denoted by $d_y$ and $d_z$. The total radiation pattern may be expressed as follows:

$$\text{totalRadiationPattern=arrayRadiationPattern×subarrayRadiationPattern×elementRadiationPattern} \quad (8)$$

Figure 7:
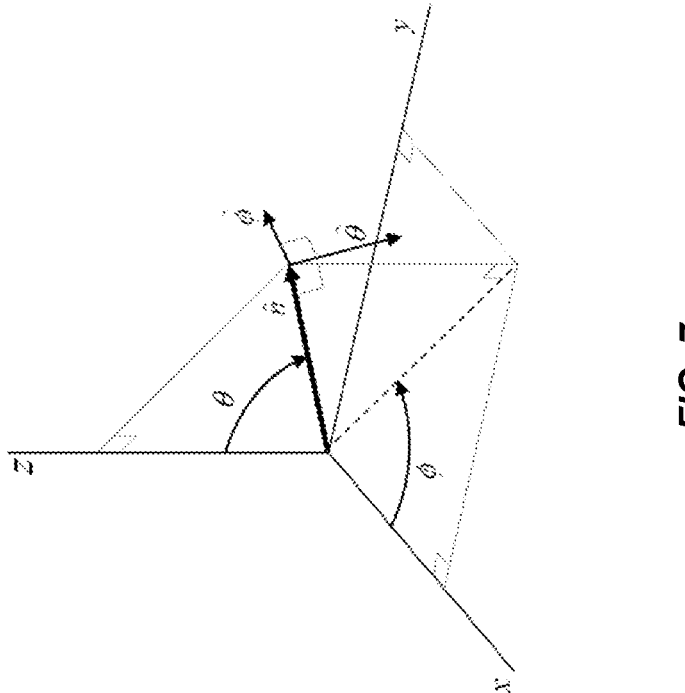
FIG. 7 illustrates a three dimensional (3D) coordinate system for determining a URA radiation pattern.

The URA radiation pattern may be determined according to the three-dimensional (3D) coordinate system of FIG. 7, as defined in Third Generation Partnership Project (3GPP) Technical Report (TR) 138 901 V15.0.0, "Study on channel model for frequencies from 0.5 to 100 GHz", Technical Report, July 2018. The URA stands in the yz-plane, where y is the horizontal axis and z is the vertical axis. The x-axis is orthogonal to the antenna array surface. The azimuth angle φ is defined from the x-axis in the xy-plane. The azimuth angle φ=0° corresponds to the array boresight. The elevation angle θ is defined from the z-axis, with θ=0° and θ=90° corresponding to the zenith and the earth azimuth respectively.

Based on this coordinate system, the spherical to Cartesian mapping yields the following relationship. A 3D vector of magnitude r may be broken down into three components $r_x$, $r_y$ and $r_z$ as follows:

$$r_x = r \cdot \sin(\theta) \cdot \cos(\varphi)$$

$$r_y = r \cdot \sin(\theta) \cdot \sin(\varphi)$$

$$r_z = r \cdot \cos(\theta) \quad (9)$$

Since the antenna array elements are in the yz-plane, their excitation weights $w \in \mathbb{C}^{M \times 1}$ for steering a beam in the $(\theta, \varphi)$ direction may be computed by combining the $r_y$ and the $r_z$ contributions from Equation (9):

$$w = \frac{1}{\sqrt{M}} vec\left(e^{-j \cdot 2\pi \cdot \frac{\kappa \cdot d_z}{\lambda} \cdot [0:M_v-1]^T \cdot \cos(\theta)} \otimes e^{-j \cdot 2\pi \cdot \frac{d_y}{\lambda} \cdot [0:M_h-1] \cdot \sin(\theta) \cdot \sin(\varphi)}\right) \quad (10)$$

where:
κ is the number of vertical antenna elements that are embedded in one subarray;

$M_v$ is the number of vertical ports that are controllable from the digital domain; this also corresponds to the number of subarrays in a given array column;

$M_h$ corresponds to the number of horizontal elements in the array;

the ⊗ operator corresponds to the Kronecker product;

the vec(·) operator denotes the vectorization operation which transforms one a×b matrix into one ab×1 vertical vector by stacking the matrix columns on top of one another; and the $$\frac{1}{\sqrt{M}}$$

scaling factor maintains unity power.

The procedure described previously for determining the ULA steering directions with the lowest gain may be repeated for the URA in both the horizontal and the vertical dimensions. This will determine $L_{\varphi,n}$ optimal azimuth directions $\varphi_{arrayNull,n}$ and $L_{\theta,n}$ elevation steering angles $\theta_{arrayNull,n}$ producing the lowest (or low enough) array gain. Once the $L_{\varphi,n}$ optimal azimuth directions $\varphi_{arrayNull,n}$ and the $L_{\theta,n}$ elevation steering angles $\theta_{arrayNull,n}$ have been identified, the various CFR noise steering vectors $v_{arrayNull,n} \in \mathbb{C}^{M \times 1}$ may be defined as follows:

$$v_{arrayNull,n}(r, s) = \frac{1}{\sqrt{M}} vec\left(e^{-j \cdot 2\pi \cdot \frac{\kappa \cdot d_z}{\lambda} \cdot [0:M_v-1]^T \cdot \cos\left(\theta_{arrayNull,n}(r)\right)} \otimes \right.$$
$$\left. e^{-j \cdot 2\pi \cdot \frac{d_y}{\lambda} \cdot [0:M_h-1] \cdot \sin\left(\theta_{arrayNull,n}(r)\right) \cdot \sin\left(\varphi_{arrayNull,n}(s)\right)}\right) \quad (11)$$

where
n is the subcarrier index;
r=1, . . . , $L_\theta$; and
s=1, . . . , $L_\varphi$.
Then, the $S_{arrayNull,n} \in \mathbb{C}^{M \times (L_\varphi \times L_\theta)}$ CFR noise steering subspace may be generated by horizontally stacking the various $v_{arrayNull,n}$(r, s) CFR noise steering vectors as shown below:

$$S_{arrayNull,n} = [v_{arrayNull}(1,1) v_{arrayNull}(1,2) \ldots v_{arrayNull}(r,s) \ldots v_{arrayNull}(L_\theta,L_\varphi)] \quad (12)$$

Finally, the massive-MIMO CFR projection matrices $C_n \in \mathbb{C}^{M \times M}$ can be defined as:

$$C_n = S_{arrayNull,n} \cdot S_{arrayNull,n}^H \quad (13)$$

The projection matrices $C_n$ are thus based on the array null space and, when used in the CRAM-based CRF scheme, result in the clipping energy being hidden in (i.e., projected into) the array null space.

It is worth noting that the cardinality and elements of the sets $\varphi_{arrayNull,n}$ and the $\theta_{arrayNull,n}$ may vary or may be constant across frequency.

In addition, the $\varphi_{arrayNull,n}$ and the $\theta_{arrayNull,n}$ sets elements may also be determined by additional or alternative factors, other than current channel information, such as, e.g., the physical cells deployment, the historical UE channel information, and/or the physical deployment of the UEs as described previously.

The projection matrices $C_n$ can be used, in lieu of the conventional projection matrices which are based on CSI, in any type of CRAM-based CFR scheme. In this regard, FIG. 8 is a flow chart that illustrates the operation of the baseband processing system 202 of the MIMO transmitter system 200 in accordance with an embodiment of the present disclosure. As illustrated, the baseband processing system 202 obtains the projection matrices $C_n$ (step 800). The projection matrices $C_n$ may be obtained, e.g., from memory, from another entity (e.g., a network node external to a base station in which the MIMO transmitter system 200 is implemented), or by computing the projection matrices $C_n$ based on information that is, e.g., obtained by the baseband processing system 202 (e.g., computed based on a historical CSI for UEs obtained during operation and stored, computed based on information related to the antenna null space provided to the baseband processing system 202 from another entity, or the like).

As described herein, the projection matrices $C_n$ are based on static or semi-static information that defines a null space of the MIMO transmitter system 200. The static or semi-static information relates to known physical directions in which the transmit power of the MIMO transmitter system 200 is less than a threshold power level. In one embodiment, the threshold power level is defined as desired number (L) of physical directions such that the L physical directions having the lowest transmit power are used. As another example, the threshold power level may be defined as a transmit power value (e.g., T decibels (dB)) such that any directions or at least up to a desired maximum number of directions for which the transmit power level is less than that transmit power level are used.

Note that, as used herein, "static information" is information that does not change. One non-limiting example of static information that defines the null space of the MIMO transmitter system 200 is one or more physical characteristics of the antenna array 216 of the MIMO transmitter system 200. Conversely, "semi-static information" is information that changes infrequently. For example, semi-static information is information that changes on a time scale much greater than a time scale at which the current channel between the MIMO transmitter system 200 and an associated receiver system changes. Examples of semi-static information include, but are not limited to, a physical deployment of one or more cells of a RAN served by a base station (e.g., a base station 102) in which the MIMO transmitter system 200 is implemented, a physical deployment of one or more cells of a RAN served by a base station (e.g., a base station 102) in which the MIMO transmitter system 200 is implemented, and/or historical channel information for the channel(s) between the MIMO transmitter system 200 and a wireless communication device(s) that receives transmissions from the MIMO transmitter system 200.

Thus, in one embodiment, the projection matrices $C_n$ are a function of static or semi-static information that define the null space of the MIMO transmitter system 200, where the one or more parameters comprise:

a) one or more physical characteristics of the antenna array 216 of the MIMO transmitter system 200 (i.e., the null space of the MIMO transmitter system 200 includes the array null space of the antenna array 216 or, in other words, the projection matrices $C_n$ are a function of the array null space of the antenna array 216), b) a physical deployment of one or more cells of a RAN served by a base station (e.g., a base station 102) in which the MIMO transmitter system 200 is implemented, c) a physical deployment of wireless communication devices 112 within a coverage area of one or more cells of a RAN served by a base station (e.g., a base station 102) in which the MIMO transmitter system 200 is implemented, d) historical channel information for one or more wireless communication devices, or e) a combination of any two or more of (a)-(d)

The baseband processing system 202, and in particular the precoder(s) 208, performs precoding (e.g., ZF-based precoding or codebook based precoding) of frequency-domain input signals to provide frequency-domain precoded signals (step 802). The baseband processing system 202, and in particular the CRAM processing system 210, processes the frequency-domain precoded signals in accordance with a CRAM processing scheme to provide time-domain transmit signals for the transmit branches 212 of the MIMO transmitter system 200 (step 804). The CRAM processing scheme uses the projection matrices $C_n$, where, as described above, the projection matrices $C_n$ are used to project the clipping noise of the MIMO transmitter system 200 into the null space of the MIMO transmitter system 200. Optionally, the baseband processing system 202 provides the time-domain transmit signals to the RF transmitter system 204 for transmission via the respective transmitter branches 212 (step 806).

Examples of CRAM-based CFR schemes in which the projection matrices $C_n$ can be used include, but are not limited to, the CRAM-based CFR schemes described in International Patent Application Publication No. WO 2020/084336 A1, entitled "SYSTEMS AND METHODS FOR MULTI-CARRIER OR MULTI-BAND LOW-PAPR PRECODING THAT HANDLE CYCLIC PREFIX," which is hereinafter referred to as "the '336 Publication".

Figure 9:
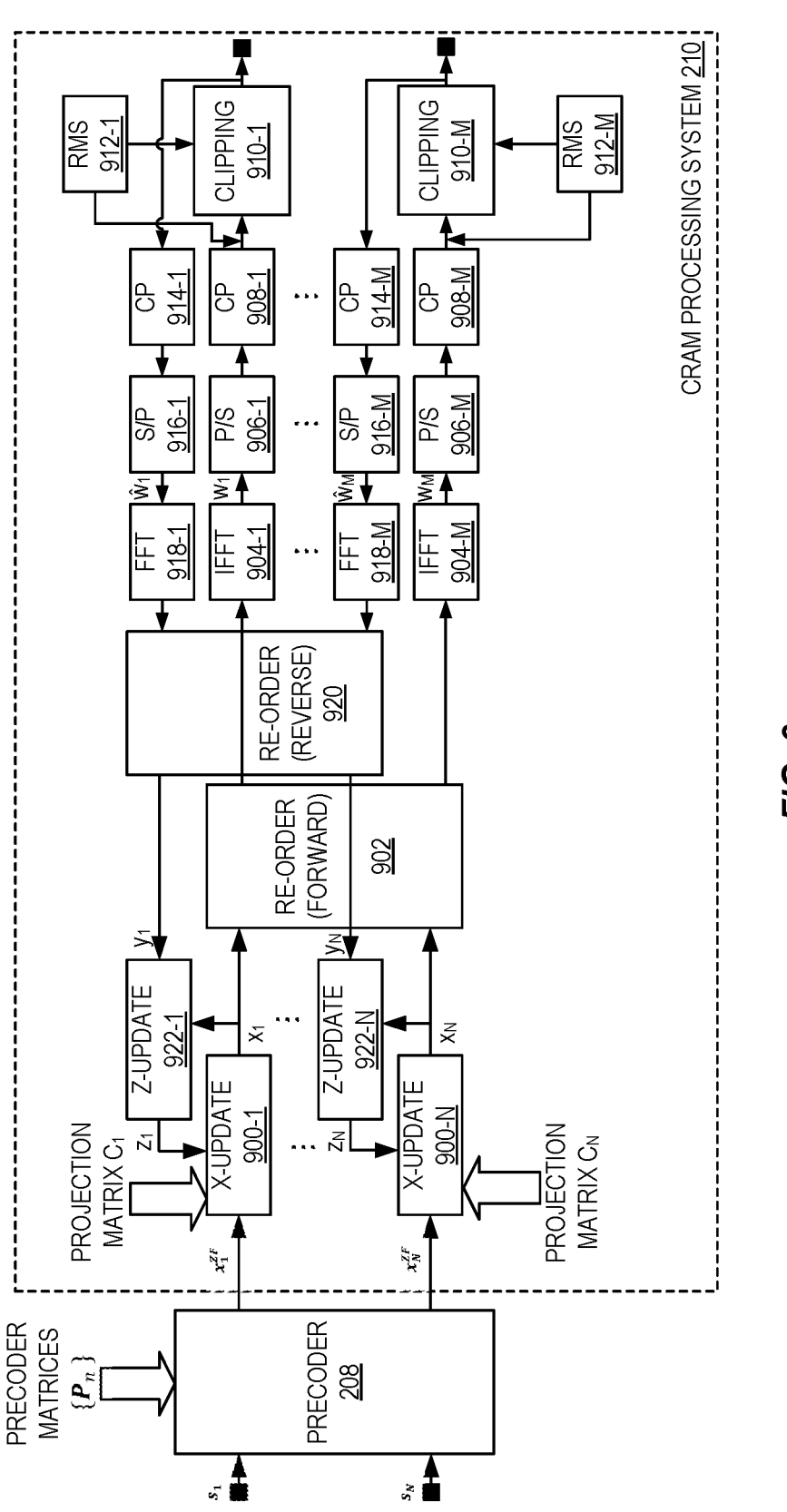
FIG. 9 illustrates one example of a CRAM processing system that implements one example of a CRAM-based CFR scheme in accordance with an embodiment of the present disclosure.

In this regard, FIG. 9 illustrates one example of the precoders 208 and the CRAM processing system 210 that implements one example of a CRAM-based CFR scheme in accordance with an embodiment of the present disclosure. FIG. 9 illustrates the precoder(s) 208 and the CRAM processing system 210 in accordance with some embodiments of the present disclosure in which the CRAM algorithm implemented by the CRAM processing system 210 provides per-antenna time-domain PAPR reduction. As illustrated, in this example, the precoder(s) 208 is(are), e.g., either ZF precoders or codebook based precoders.

The precoder 208 receives a number (N) of frequency-domain input signals $S_n \in \mathbb{C}^{K \times 1}$ for n=1, . . . , N. The frequency-domain input signals $s_n$ are also referred to herein as layer-domain input vectors. The number N is the number of tones in the OFDM symbol. For example, for a 20 megahertz (MHz) LTE signal, N=2048 and K is typically in the range of, e.g., 2 to 8. The precoder 208 is a linear precoder that performs digital beamforming individually on each frequency-domain input signal $s_n$ using a respective precoding matrix $P_n$ to produce a respective frequency-domain precoded signal $x_n \in \mathbb{C}^{M \times 1}$.

In an embodiment in which the precoder 208 is a ZF precoder, the precoder 208 operates on a total of $|\mathcal{T}|$ tones and the remaining $|\mathcal{T}^c|$ tones are unused and set to zero, where $|\mathcal{T}| + |\mathcal{T}^c| = N$. Further, for a ZF precoder, the precoder matrix $P_n$ is set to the "right pseudo-inverse"

$$H_n^\dagger$$

of the MIMO channel matrix $H_n$ as shown in Equation 14. In the case of ZF precoding, the precoder 208 enforces the spatial constraints given in Equation 15, such that tone $x_n = P_n s_n$ is received at the UE as $$H_n x_n = H_n P_n s_n = H_n H_n^\dagger s_n = s_n,$$

and so this ZF precoding scheme removes all multiple access interference between layers in the ideal case.

$$P_n^{ZF} = H_n^{\dagger} \equiv H_n^H \left( H_n H_n^H \right)^{-1} \tag{14}$$

$$s_n = H_n x_n^{ZF}, \, n \in \mathcal{T} \tag{15}$$

$$s_n = 0^{K \times 1}, \, n \in \mathcal{T}^C$$

In an embodiment in which the precoder 208 is a ZF precoder, the precoder 208 applies a precoding matrix $P_n$ that is computed from the scheduled UE's CSI.

Each of the N precoded vectors $x_n$ contains M samples to be distributed evenly across the M antenna branches after performing respective CRAM X-updates, as described below. The frequency-domain precoded vectors $x_n$ for n=1, . . . , N (also referred to herein as frequency-domain precoded signals $x_n$ for n=1, . . . , N) are provided to the CRAM processing system 210.

The CRAM processing system 210 performs a CRAM algorithm that includes per-antenna PAPR reduction according to Equation 16.

$$\bar{z}^{(0)} = 0 \tag{16}$$

for $k = 1, 2, \ldots$ do $\quad x_n^{(k)} = C_n \cdot z_n^{(k-1)} + x_n$, (in the case of ZF, for only $\forall\, n \in \mathcal{T}$)

$\quad$ in the case of ZF, $x_n^{(k)} = 0, \, \forall\, n \in \mathcal{T}^C$ $\quad \bar{w} = \bar{F}^H T \left( 2\bar{x}^{(k)} - \bar{z}^{(k-1)} \right)$ $\quad \hat{w} = \mathrm{clip}\left( \bar{w}, \bar{P} \right)$ $\quad \bar{y}^{(k)} = T^T F \hat{w}$ $\quad \bar{z}^{(k)} = \bar{z}^{(k-1)} + \bar{y}^{(k)} - \bar{x}^{(k)}$ end In Equation 16:

$\bar{z}^{(k)}$ is a collection of frequency-domain Z-update outputs generated by the CRAM processing system 210 for all N tones for the k-th iteration of the CRAM algorithm.

$$x_n^{(k)}$$

is a frequency-domain X-update output generated by the CRAM processing system 210 for the n-th tone for the k-th iteration of the CRAM algorithm.

$C_n \in \mathbb{C}^{M \times M}$ is the projection matrix for the n-th tone.

$$z_n^{(k-1)}$$

is a frequency-domain Z-update output generated by the CRAM processing system 210 for the n-th tone for the (k−1)-th iteration of the CRAM algorithm.

$\bar{w}$ is a collection of time-domain signals $w_m$ for m=1, . . . , M generated by the CRAM processing system 210 for the M transmit branches 212, respectively.

$\bar{F}_H$ is a matrix transform equivalent to the Inverse Discrete Fourier transform.

$T(\;)$ is a permutation matrix that re-orders the samples from layers into streams for transmission over M transmit branches 212.

$\bar{x}^{(k)}$ is a collection of frequency-domain X-update outputs generated by the CRAM processing system 210 for all N tones for the k-th iteration of the CRAM algorithm.

$\hat{w}$ is a collection of clipped versions of the time-domain signals $w_m$ for m=1, . . . , M generated by the CRAM processing system 210 for the M transmit branches 212, respectively.

$\bar{P}$ is a collection of separate clipping thresholds $P_m$ for m=1, . . . , M for the M transmit branches 212 of the MIMO transmitter system 200.

$\bar{y}^{(k)}$ is a collection of frequency-domain feedback signals $y_n^{(k)}$ generated by the CRAM processing system 210 for the n-th tone for the k-th iteration of the CRAM algorithm.

Note that $$x_n^{(k)} = C_n \cdot z_n^{(k-1)} + x_n$$

from Equation 16 is referred to herein as the "X-UPDATE" and $\bar{z}^{(k)} = \bar{z}^{(k-1)} + \bar{y}^{(k)} - \bar{x}^{(k)}$ from Equation 16 is referred to herein as the "Z-UPDATE" for the example CRAM algorithm of Equation 16.

The CRAM processing system 210 of FIG. 9 operates to perform the CRAM algorithm of Equation 16 as follows. A number of X-update functions 900-1 through 900-N operate to perform frequency-domain X-update procedures for the N tones for n=1, . . . , N, respectively, in accordance with Equation 16 above. In the forward direction, the frequency-domain X-update outputs $$x_n^{(k)}$$

for n=1, . . . , N are provided to a re-ordering function 902 that re-orders the frequency-domain X-update outputs $$x_n^{(k)}$$

to generate a new set of M vectors $a_m$ each containing N frequency-domain samples. In other words, each of the N frequency-domain X-update outputs $$x_n^{(k)}$$

contains M samples that are distributed evenly across the M antenna branches via the re-ordering function 902. The re-ordered vectors $a_m$ for m=1, . . . , M (also referred to herein as re-ordered signals) are converted from the frequency-domain to the time-domain via respective Inverse Fast Fourier Transforms (IFFTs) 904-1 through 904-M to provide the time-domain signals $w_m$ for m=1, . . . , M for the M antenna branches, respectively. Time-domain processing is then performed on the M time-domain signals $w_m$ to provide M time-domain transmit signals. In this example, the time-domain processing includes Parallel-to-Serial (P/S) conversion by P/S converters 906-1 through 906-M and prepending Cyclic Prefixes (CPs) via CP functions 908-1 through 908-M, respectively. Time-domain clipping functions 910-1 through 910-M perform time-domain clipping of the M time-domain transmit signals for the M antenna branches using the M separate clipping thresholds $P_m$ for the M antenna branches, respectively, to thereby provide M clipped time-domain transmit signals for the M antenna branches. The M clipped time-domain transmit signals are output to the RF transmitter system 204 for transmission.

The M separate clipping thresholds $P_m$ for the M antenna branches are determined, e.g., by the time-domain clipping functions 910-1 through 910-M as a function of the Root Mean Square (RMS) levels of the respective time-domain transmit signals. For example, the clipping threshold $P_m$ can be set to the desired level of PAPR reduction. As a specific example, to achieve a final PAPR of 3 dB to 5 dB, the clipping threshold $P_m$ can be set to be 4 dB above the measured RMS level. The RMS levels of the M time-domain transmit signals are determined by respective RMS level measurement functions 912-1 through 912-M. In this manner, each of the time-domain transmit signals is independently clipped to a level that is appropriate for its own RMS signal level. Note that while clipping is used in the example of FIG. 9 and Equation 16, other time-domain PAPR reduction techniques may be used. Some examples of other time-domain PAPR reduction techniques that can be used include a Lookup Table (LUT) use to shape the signal envelope. Rather than hard clipping based on the envelope, the envelope can be passed through a LUT that implements a "soft compression" function. This performs an arbitrary shaping of the signal envelope as a more flexible alternative to hard clipping.

In the reverse direction, the M clipped time-domain transmit signals are fed back through respective CP dropping functions 914-1 through 914-M and respective Serial-to-Parallel (S/P) converters 916-1 through 916-M to provide the M time-domain feedback signals for the M antenna branches, respectively, which correspond to the collection w of the clipped time-domain signals in Equation 16 above. The M time-domain feedback signals are converted from the time-domain to the frequency-domain via respective Fast Fourier Transforms (FFTs) 918-1 through 918-M. A re-ordering function 920 performs a reverse re-ordering of the frequency-domain feedback signals to provide the N frequency-domain feedback signals $$y_n^{(k)}$$

for the N tones, respectively. The N frequency-domain feedback signals $$y_n^{(k)}$$

are provided to respective Z-update functions 922-1 through 922-N, which operate to perform a frequency-domain Z-update procedure in accordance with Equation 16 above. In particular, for each k-th iteration of the CRAM algorithm, the Z-update functions 922-1 through 922-N compute the collection of frequency-domain Z-update outputs as $\bar{z}^{(k)}=\bar{z}^{(k-1)}+\bar{y}^{(k)}-\bar{x}^{(k)}$.

The N frequency-domain Z-update outputs $$z_n^{(k)}$$

are provided to the N X-update functions 900-1 through 900-N, respectively, where they are used by the X-update functions 900-1 through 900-N to perform the frequency-domain X-update procedure for the N tones.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
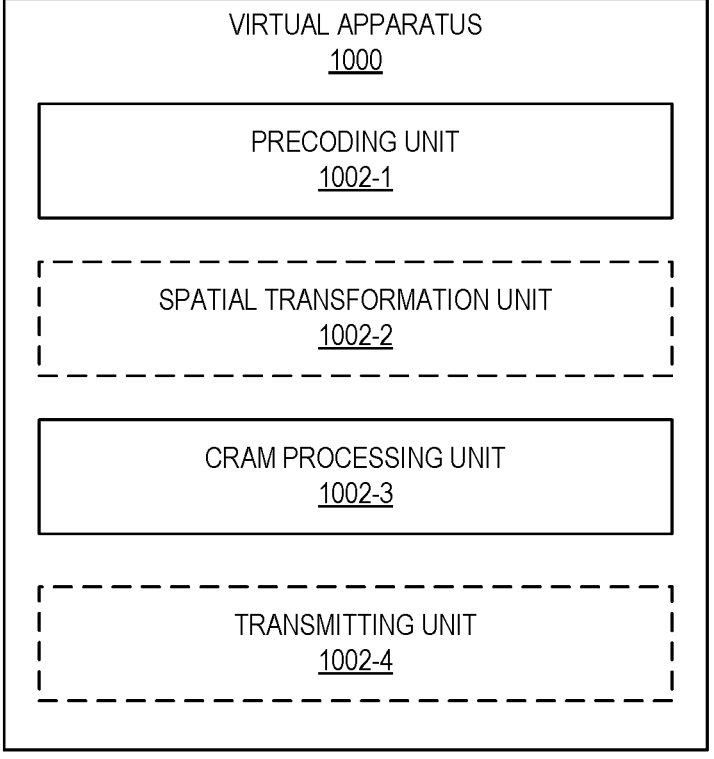
FIG. 10 illustrates a schematic block diagram of an apparatus in which embodiments of the present disclosure may be implemented.

In this regard, FIG. 10 illustrates a schematic block diagram of a virtual apparatus 1000 in which embodiments of the present disclosure may be implemented. The virtual apparatus 1000 may be implemented in a transmitter (e.g., the MIMO transmitter system 200). The virtual apparatus 1000 is operable to carry out the example method described with reference to FIG. 8 and possibly any other processes or methods disclosed herein. It is also to be understood that the method of FIG. 8 is not necessarily carried out solely by the virtual apparatus 1000. At least some operations of the method can be performed by one or more other entities.

The virtual apparatus 1000 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols, as well as instructions for carrying out one or more of the techniques described herein, in several embodiments. In some implementations, the processing circuitry may be used to cause a precoding unit 1002-1, an optional spatial transformation unit 1002-2, a CRAM processing unit 1002-3, and an optional transmitting unit 1002-4, and any other suitable units of the virtual apparatus 1000 to perform corresponding functions according one or more embodiments of the present disclosure.

As illustrated in FIG. 10, the virtual apparatus 1000 includes the precoding unit 1002-1 that operates to performing precoding as described herein, the optional spatial transformation unit 1002-2 that operates to perform spatial transformation as described herein, the CRAM processing unit 1002-3 that operates to perform CRAM processing as described herein, and the optional transmitting unit 1002-4 that operates to perform transmission as described herein.

The term unit may have conventional meaning in the field of electronics, electrical devices and/or electronic devices, and may include, for example, electrical and/or electronic circuitry, devices, modules, processors, memory, logic solid state and/or discrete devices, computer programs or instructions for carrying out respective tasks, procedures, computations, outputs, and/or displaying functions, and so on, such as those that are described herein.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3D Three Dimensional
3GPP Third Generation Partnership Project
5G Fifth Generation
5GC Fifth Generation Core
5GS Fifth Generation System
ADC Analog-to-Digital Converter
ASIC Application Specific Integrated Circuit
CFR Crest Factor Reduction
CP Cyclic Prefix
CRAM Convex Reduction of Amplitude
CSI Channel State Information
dB Decibels
DSP Digital Signal Processor
eNB Enhanced or Evolved Node B
EPC Evolved Packet Core
EPS Evolved Packet System
E-UTRAN Evolved Universal Terrestrial Radio Access Network
EVM Error Vector Magnitude
FFT Fast Fourier Transform
FPGA Field Programmable Gate Array
gNB New Radio Base Station
IFFT Inverse Fast Fourier Transform
LUT Lookup Table
LTE Long Term Evolution
MHz Megahertz
MIMO Multiple Input Multiple Output
ng-eNB Next Generation Enhanced or Evolved Node B
NG-RAN Next Generation Radio Access Network
NR New Radio
OFDM Orthogonal Frequency Division Multiplexing
P/S Parallel-to-Serial
PAPR Peak-to-Average Power Ratio
PMI Precoding Matrix Index
RAM Random Access Memory
RAN Radio Access Network
RF Radio Frequency
RMS Root Mean Square
ROM Read Only Memory
RRH Remote Radio Head
S/P Serial-to-Parallel
SRS Sounding Reference Symbol
SVD Singular Value Decomposition
TDD Time Division Duplexing
TR Technical Report
UE User Equipment
ULA Uniform Linear Array
URA Uniform Rectangular Array
ZF Zero-Forcing Those skilled in the art will recognize improvements and modifications to the embodiments of the present disclosure.

All such improvements and modifications are considered within the scope of the concepts disclosed herein.

What is claimed is:

1. A method performed by a processing system for a Multiple Input Multiple Output, MIMO, Orthogonal Division Multiplexing, OFDM, transmitter system, the method comprising:

precoding a plurality of frequency-domain input signals to provide frequency-domain precoded signals for a plurality of subcarriers, the plurality of frequency-domain input signals comprising information for one or more transmit layers; and processing the frequency-domain precoded signals in accordance with a Convex Reduction of Amplitude, CRAM, based processing scheme to provide a plurality of time-domain precoded signals for a plurality of respective transmit branches of the MIMO OFDM transmitter system, wherein:

the CRAM-based processing scheme uses a plurality of projection matrices for the plurality of subcarriers, respectively, to project clipping energy into a null space of the MIMO OFDM transmitter system; and the plurality of projection matrices are a function of static or semi-static information that defines the null space of the MIMO OFDM transmitter system, the static or semi-static information being static or semi-static information that relates to physical directions at which transmit power of the MIMO OFDM transmitter system is less than a threshold transmit power level.

2. The method of claim 1 further comprising providing the plurality of time-domain precoded signals to the plurality of transmit branches of the MIMO OFDM transmitter system.

3. The method of claim 1 wherein the static or semi-static information comprises one or more physical characteristics of an antenna array of the MIMO OFDM transmitter system.

4. The method of claim 3 wherein the null space of the MIMO OFDM transmitter system comprises an array null space of the antenna array of the MIMO OFDM transmitter system, the array null space being a function of the one or more physical characteristics of the antenna array.

5. The method of claim 3 wherein the static or semi-static information further comprises:

i) a physical deployment of one or more cells of a radio access network served by a base station in which the MIMO OFDM transmitter system is implemented;

ii) a physical deployment of wireless communication devices within a coverage area of one or more cells of a radio access network served by a base station in which the MIMO OFDM transmitter system is implemented;

iii) historical channel information for one or more wireless communication devices; or iv) a combination of any two or more of (i)-(iii).

6. The method of claim 1 wherein the plurality of projection matrices are defined as $C_n \in \mathbb{C}^{M \times M}$ where:

$$C_n = S_{arrayNull,n} \cdot S_{arrayNull,n}^H$$

where $S_{arrayNull,n}$ is the null space of the MIMO OFDM transmitter system.

7. The method of claim 1 wherein the static or semi-static information comprises a physical deployment of one or more cells of a radio access network served by a base station in which the MIMO OFDM transmitter system is implemented.

8. The method of claim 1 wherein the static or semi-static information comprises a physical deployment of wireless Communication devices within a coverage area of one or more cells of a radio access network served by a base station in which the MIMO OFDM transmitter system is implemented.

9. The method of claim 1 wherein the static or semi-static information comprises historical channel information for one or more wireless communication devices.

10. The method of claim 1 further comprising obtaining the plurality of projection matrices.

11. The method of claim 10 wherein obtaining the plurality of projection matrices comprises obtaining the plurality of projection matrices or information from which the plurality of projection matrices are computed or otherwise determined from an entity that is external to the MIMO OFDM transmitter system.

12. A processing system for a Multiple Input Multiple Output, MIMO, Orthogonal Division Multiplexing, OFDM, transmitter system, the processing system comprising:
  precoder circuitry configured to precode a plurality of frequency-domain input signals to provide frequency-domain precoded signals for a plurality of subcarriers, the plurality of frequency-domain input signals comprising information for one or more transmit layers; and
  processing circuitry configured to process the frequency-domain precoded signals in accordance with a Convex Reduction of Amplitude, CRAM, based processing scheme to provide a plurality of time-domain precoded signals for a plurality of respective transmit branches of the MIMO OFDM transmitter system, wherein:
    the CRAM-based processing scheme uses a plurality of projection matrices for the plurality of subcarriers, respectively, to project clipping energy into a null space of the MIMO OFDM transmitter system; and
    the plurality of projection matrices are a function of static or semi-static information that defines the null space of the MIMO OFDM transmitter system, the static or semi-static information being static or semi-static information that relates to physical directions at which transmit power of the MIMO OFDM transmitter system is less than a threshold transmit power level.

13. The processing system of claim 12 wherein the processing circuitry is further configured to provide the plurality of time-domain precoded signals to the plurality of transmit branches of the MIMO OFDM transmitter system.

14. The processing system of claim 12 wherein the static or semi-static information comprises one or more physical characteristics of an antenna array of the MIMO OFDM transmitter system.

15. The processing system of claim 14 wherein the null space of the MIMO OFDM transmitter system comprises an array null space of the antenna array of the MIMO OFDM transmitter system, the array null space being a function of the one or more physical characteristics of the antenna array.

16. The processing system of claim 14 wherein the static or semi-static information further comprises:

i) a physical deployment of one or more cells of a radio access network served by a base station in which the MIMO OFDM transmitter system is implemented;

ii) a physical deployment of wireless communication devices within a coverage area of one or more cells of a radio access network served by a base station in which the MIMO OFDM transmitter system is implemented;

iii) historical channel information for one or more wireless communication devices; or iv) a combination of any two or more of (i)-(iii).

17. The processing system of claim 12 wherein the plurality of projection matrices are defined as $C_n \in \mathbb{C}^{M \times M}$ where:

$$C_n = S_{arrayNull,n} \cdot S_{arrayNull,n}{}^H$$

where $S_{arrayNull,n}$ is the null space of the MIMO OFDM transmitter system.

18. A method performed by a processing system for a Multiple Input Multiple Output, MIMO, Orthogonal Division Multiplexing, OFDM, transmitter system, the method comprising:
  obtaining a plurality of projection matrices for the plurality of subcarriers, respectively, that are a function of static or semi-static information that defines a null space of the MIMO OFDM transmitter system, the static or semi-static information being static or semi-static information that relates to physical directions at which transmit power of the MIMO OFDM transmitter system is less than a threshold transmit power level; and
  using the plurality of projection matrices to generate a plurality of transmit signals for a plurality of respective transmit branches of the MIMO OFDM transmitter system,
  wherein the static or semi-static information comprises:
    (a) one or more physical characteristics of an antenna array of the MIMO OFDM transmitter system, (b) a physical deployment of one or more cells of a radio access network served by a base station in which the MIMO OFDM transmitter system is implemented, (c) a physical deployment of wireless communication devices within a coverage area of one or more cells of a radio access network served by a base station in which the MIMO OFDM transmitter system is implemented, (d) historical channel information for one or more wireless communication devices, or (e) a combination of any two or more of (a)-(d).

19. The method of claim 18 wherein obtaining the plurality of projection matrices comprises obtaining the plurality of projection matrices or information from which the plurality of projection matrices are computed or otherwise determined from an entity that is external to the MIMO OFDM transmitter system.

* * * * *